(12) United States Patent
Komori et al.

(10) Patent No.: US 8,437,411 B2
(45) Date of Patent: May 7, 2013

(54) RECEIVING APPARATUS

(75) Inventors: Chisato Komori, Ishikawa (JP); Yoshitaka Yoshino, Tokyo (JP); Koichi Mukai, Ishikawa (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 12/720,302

(22) Filed: Mar. 9, 2010

(65) Prior Publication Data
US 2010/0239029 A1 Sep. 23, 2010

(30) Foreign Application Priority Data
Mar. 17, 2009 (JP) ................................ 2009-064539

(51) Int. Cl.
*H04B 3/00* (2006.01)
*H04L 25/00* (2006.01)

(52) U.S. Cl.
USPC ........................................................ 375/257

(58) Field of Classification Search ........................ None
See application file for complete search history.

(56) References Cited

U.S. PATENT DOCUMENTS

| | | | | |
|---|---|---|---|---|
| 4,582,661 A | * | 4/1986 | Ito et al. ........................ | 264/277 |
| 2004/0155720 A1 | * | 8/2004 | Yasui et al. ..................... | 333/12 |
| 2008/0122711 A1 | | 5/2008 | Kimura et al. | |
| 2008/0198090 A1 | | 8/2008 | Yamaguchi et al. | |
| 2009/0201421 A1 | * | 8/2009 | Mawatari et al. ............. | 348/553 |

FOREIGN PATENT DOCUMENTS

| | | |
|---|---|---|
| EP | 1 492 287 A1 | 12/2004 |
| EP | 1 788 712 A2 | 5/2007 |
| EP | 1788712 A2 * | 5/2007 |
| JP | 02-288429 | 11/1990 |
| JP | 4123262 | 5/2008 |
| JP | 2008-263252 A | 10/2008 |

* cited by examiner

*Primary Examiner* — David C. Payne
*Assistant Examiner* — Wednel Cadeau
(74) *Attorney, Agent, or Firm* — Wolf, Greenfield & Sacks, P.C.

(57) ABSTRACT

A receiving apparatus includes: an electronic device; a connector provided to the electronic device; and a transmission cable connected to the connector. The electronic device includes a tuner unit that receives broadcast waves; and a differential signal processing unit that sends and receives data with the use of differential signals. The tuner unit and the differential signal processing unit are connected to the connector. The transmission cable includes at least two transmission lines that transmit differential signals, and the at least two transmission lines are capacitively coupled with each other at high frequency bands owing to capacitances among the at least two transmission lines. In addition, there is at least one common mode choke across two differential signal transmission lines inside the electronic device.

13 Claims, 12 Drawing Sheets

RECEIVING APPARATUS

BACKGROUND OF THE INVENTION

1. Field of the Invention

The present invention relates to receiving apparatuses that receive, for example, broadcast waves.

2. Description of the Related Art

In recent years, various kinds of communication terminals, as typified by a cellular phone, that have functions for receiving broadcast waves of FM radio, digital radio or television have become widely used.

The electrical length of an antenna of a communication terminal for receiving, for example, FM broadcast waves are typically 3 m or so. Therefore, the size of the antenna is very large compared with the size of the body of the communication terminal for receiving FM broadcast waves. In contrast, the bodies of the receiving terminals for receiving broadcast waves have been becoming thinner and more reduced in size year by year.

One effective means for solving this unbalanced relation between the size of the antenna and the size of the body of the communication terminal is an adjunct cable, which is attached to the body of the communication terminal and equipped with an antenna function, as typified by an earphone antenna. An representative example of such an earphone antenna is disclosed in Japanese Patent No. 4123262.

In receiving broadcast waves, how a received high frequency signal is separated from an audio signal and a power signal that are transmitted through the adjunct cable is very important. If the frequencies of these signals are lower than several kHz, the problem is solved by preparing a new cable and connector pins. However, if the frequencies are several hundred MHz or more, the signals leak from their original cables to other cables owing to capacitive coupling among the original cables, resulting in the increase of transmission losses of the signals.

In the above Japanese patent, this problem is solved by disposing a high-frequency cutoff circuit on the earphone antenna or on the receiving terminal, that is, by employing a technology to separate overlapped signals with the use of frequency differences among signals.

SUMMARY OF THE INVENTION

However, if the frequencies of the signals to be separated overlap each other, they are not separated by the above method. A method in which the overlapped high frequency signals are divided into two groups with the use of a signal distributor and the two groups are fed to two transceiver circuits individually, or another method in which image data and the like among the overlapped high frequency signals are transmitted with the use of an external unit such as a tuner has been proposed.

There are, however, following problems about the above methods. As for the method to use the signal distributor, there is a problem in that the power of signals input to each transceiver circuit is half the power of the original signals, which results in the deterioration of the characteristics of the signals obtained by each transceiver circuit. As for the method to use the external unit, there is a problem in that, although the body of the receiving terminal can be downsized, the total cost of the receiving terminal and the external unit rises and additional parts have to be mounted on the receiving terminal. In addition, there is another problem in that a user has to take along the external unit with him/her, which brings about an inconvenience from the viewpoint of portability.

The above-described techniques do not provide a desirable antenna characteristics when other signals, which frequencies overlap the frequency of the received high frequency signal, are transmitted on a connector cable that is used for an antenna. In addition, if a connector is used for the two signals in common, it is necessary to prepare plural cables.

According to an embodiment of the present invention, an desirable antenna characteristics can be obtained when the other signals, which frequencies overlap the frequency of the received high frequency signal, are transmitted on a connector cable that is used for an antenna. In addition, it is not necessary to prepare plural cables even if the connector is used in common with the received high frequency signal and the other signals.

A receiving apparatus according to an embodiment of the present invention includes: an electronic device; a connector that is provided to the electronic device; and a transmission cable that is connected to the connector. The electronic device includes a tuner unit that receives broadcast waves and a differential signal processing unit that sends and receives data with the use of differential signals. The tuner unit and the differential signal processing unit are connected to the connector. The transmission cable includes at least two transmission lines that transmit differential signals, and the at least two transmission lines are capacitively coupled with each other at high frequency bands owing to capacitances among the at least two transmission lines. In addition, there is at least one common mode choke across two differential signal transmission lines inside the electronic device.

According to an embodiment of the present invention, even if the other signals which frequencies overlap the frequency of the received high frequency signal are transmitted on the connector cable that is also used for the antenna, the desirable antenna characteristics can be obtained. In addition, it is not necessary to prepare plural cables even if a connector is used in common with the received high frequency signal and the other signals.

DESCRIPTION OF THE PREFERRED EMBODIMENTS

Embodiments of the present invention will be described in detail hereinafter with reference to the drawings. The description will be made about the following subjects in this order.

1. A first embodiment of the present invention (a first configuration example of a receiving apparatus)
2. A second embodiment of the present invention (a second configuration example of the receiving apparatus)
3. A third embodiment of the present invention (a third configuration example of the receiving apparatus)
4. A fourth embodiment of the present invention (a fourth configuration example of the receiving apparatus)
5. A fifth embodiment of the present invention (a fifth configuration example of the receiving apparatus)
6. A sixth embodiment of the present invention (a sixth configuration example of the receiving apparatus)
7. A seventh embodiment of the present invention (a seventh configuration example of the receiving apparatus)

1. The First Embodiment of the Present Invention

Figure 1:
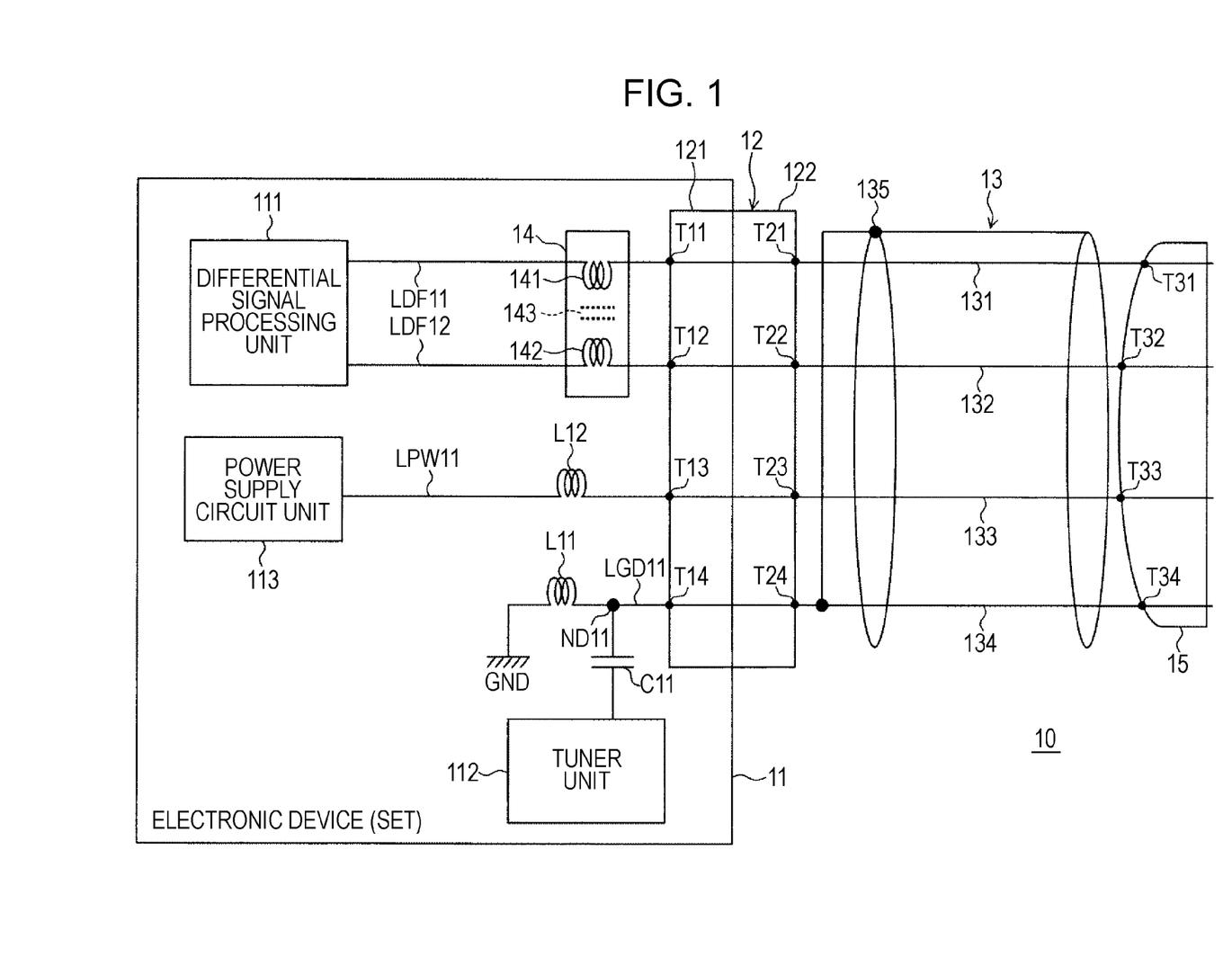
FIG. 1 is a diagram showing the configuration of a receiving apparatus according to a first embodiment of the present invention.

FIG. 1 is a diagram showing the configuration of the receiving apparatus according to the first embodiment of the present invention.

This receiving apparatus 10 includes an electronic device (set) 11, a connector 12, a multi-core shielded cable 13 used as a transmission cable, a common mode choke 14, and a second connector 15.

The electronic device 11 includes a differential signal processing unit 111, a tuner unit 112, a power supply circuit unit 113, differential signal transmission lines LDF11 and LDF12, a ground line LGD11 in the electronic device, a power supply line LPW11, and a capacitor C11. In addition, the electronic device 11 includes inductors L11 and L12 used as high frequency cutoff elements.

The differential signal processing unit 111 is connected to the connector 12 through the differential signal transmission lines LDF11 and LDF12. The common mode choke (coil) 14 is installed across the differential signal transmission lines LDF11 and LDF12. In other words, in this first embodiment of the present invention, the common mode choke 14 is installed in the electronics apparatus.

The common mode choke (coil) has a function of canceling common mode noises by using the difference between transmission modes. Here, common mode noises are generated between signal lines (or power supply lines) and ground, and their currents flow in the same direction through the signal lines (or the power supply lines). The common mode choke (coil) 14 is composed of two conductive wires 141 and 142, and a ferrite core 143, and the common mode choke 14 is formed so that each of the two conductive wires is wound around the ferrite core 143 in the direction opposite to that of the other. In FIG. 1, the schematic circuit of the common mode choke 14 is shown. Generally speaking, a noise is transmitted mainly in the common mode while an effective signal is transmitted mainly in the normal mode, so that the signal can be separated from the noise with the use of the common mode choke 14.

Because the magnetic fluxes generated in the common mode choke 14 by individual common mode currents are added owing to the mutual inductance of the common mode choke 14, the common mode choke functions as an inductor that provides a large impedance against the common mode currents. On the other hand, the common mode choke has little effect on normal mode effective signals. Therefore, the common mode choke 14 is more effective for canceling the common mode noises than two inductors without a mutual inductance between them.

The common mode choke 14 does not provide an impedance against normal mode currents because each of magnetic fluxes generated by the normal mode currents cancels the other in the ferrite core. Therefore, the decrease of the impedance for the common mode currents owing to the magnetic saturation of the common mode choke 14 is small, and the waveforms of the signals that pass through the common mode choke 14 are hardly affected. In other words, the common mode choke 14 is effective at canceling noises associated with differential signals and the like.

The tuner unit 112 is connected to the ground line LGD11 in the electronic device through the capacitor C11, and a node ND11 is formed at the connection point. One end of the ground line LGD11 in the electronic device is connected to the connector 12, and the other end is connected to a ground terminal GND in the body of the electronic device 11. The inductor L11 is installed between the node ND11 on the ground line LGD11 in the electronic device and the ground terminal GND in the electronic device. In this way, the ground line LGD11 in the electronic device is connected to the tuner unit 112 at the node ND11 through the capacitor C11. This capacitor C11 is installed to stop electrostatic discharge and to cutoff a DC current. There may be a case where the capacitor is unnecessary depending on the configuration of this receiving apparatus 10.

The power supply circuit unit 113 is connected to the connector 12 through the power supply line LPW11. The L12 is installed on the power supply line LPW11 that connects the power supply circuit unit 113 to the connector 12.

The inductors L11 and L12 are installed on the ground line LGD11 in the electronic device and the power supply line LPW11 respectively to cutoff the high frequency signals, and they can be replaced with other high frequency elements that have the same functions as the inductors L11 and L12. Although the general circuit configuration for the receiving apparatus 10 has been described so far, the power supply circuit unit 113 may be also unnecessary depending on the configuration of this receiving apparatus 10.

In the electronic device 11, the transmission lines are capacitively coupled with each other at high frequency bands owing to capacitances among the transmission lines. In other words, the differential signal transmission lines LDF11 and LDF12 are capacitively coupled owing to capacitances between the two lines at high frequency bands. The relation between the differential signal transmission line LDF12 and the power supply line LPW11, and the relation between the power supply line LPW11 and the ground line LGD11 in the electronic device can be said to be similar to the relation between the differential signal transmission lines LDF11 and LDF12.

The connector 12 is mounted on the electronic device 11 to connect the electronic device 11 to the multi-core shielded cable 13. The connector 12 is composed of a first connection section 121 that is fixed to the electronic device 11 and a second connection section 122 through which one end of each core line of the multi-core shielded cable 13 is connected to the first connection section 121. The connector 12 can be configured so that the first connection section 121 and the second connection section 122 are fixedly jointed or the second connection section 122 is removable from the first connection section 121.

The first connection section 121 includes terminals T11, T12, T13, and T14. The terminal T11 is connected to one end of the differential signal transmission line LDF11. The terminal T12 is connected to one end of the differential signal transmission line LDF12. The terminal T13 is connected to one end of the power supply line LPW11. The terminal T14 is connected to one end of the ground line LGD11 in the electronic device.

The second connection section 122 includes terminals T21, T22, T23, and T24. When the second connection section 122 is in a connected state with the first connection section 121, terminals T21, T22, T23, and T24 are electrically connected to the terminals T11, T12, T13, and T14 respectively.

To put it concretely, when the second connection section 122 is in a connected state with the first connection section 121, the terminal T21 is electrically connected to the terminal T11; when the second connection section 122 is in a connected state with the first connection section 121, the terminal T22 is electrically connected to the terminal T12; when the second connection section 122 is in a connected state with the first connection section 121, the terminal T23 is electrically connected to the terminal T13; and when the second connection section 122 is in a connected state with the first connection section 121, the terminal T24 is electrically connected to the terminal T14.

The multi-core shielded cable 13 includes: plural core lines (for example, four core lines 131 to 134 in FIG. 1); a shield section 135 that houses the plural core lines covered by insulating material (not shown); and an insulating sheet (also called an insulating outer coat or a jacket) that envelops the above combination of the plural core lines and the shield section 135 as a whole.

One end of the multi-core shielding cable 13 is subjected to terminal treatment, and the core lines 131 to 134 are connected to the second connection section 122 of the connector 12. In other words, one end of the core line 131 is connected to the terminal T21 of the second connection section 122, one end of the core line 132 is connected to the terminal T22 of the second connection section 122, one end of the core line 133 is connected to the terminal T23 of the second connection section 122, and one end of the core line 134 is connected to the terminal T24 of the second connection section 122.

The other end of the multi-core shielded cable 13 is connected to the second connector 15 to be connected to an external electronic device (not shown). The second connector 15 includes terminals T31, T32, T33, and T34. The other end of the core line 131 is connected to the terminal T31 of the second connector 15, and the other end of the core line 132 is connected to the terminal T32 of the second connector 15. The other end of the core line 133 is connected to the terminal T33 of the second connector 15, and the other end of the core line 134 is connected to the terminal T34 of the second connector 15.

The core lines 131 and 132 of the multi-core shielded cable 13 are used to communicate with the external electronic device with the use of differential signals. The core line 133 of the multi-core shielded cable 13 is used as a power supply line.

The shield section 135 of the multi-core shielded cable 13 is connected to the core line 134 that is connected to the tuner unit 112 of the electronic device 11, resulting in an antenna structure. Owing to this antenna structure, high frequency signals that resonate with the length of the shield section 135 can be taken into the electronic device 11. Because this antenna structure has two routes to be used as resonators, the received frequency band can be broadened.

The core lines of the multi-core shielded cable 13 are capacitively coupled with each other at high frequency bands owing to capacitances among the core lines. In other words, the core lines 131 and 132 are capacitively coupled owing to capacitances between the two core lines at the high frequency bands. The relation between the core lines 132 and 133 and the relation between the core lines 133 and 134 can be said to be similar to the relation between the core lines 131 and 132.

Figure 2:
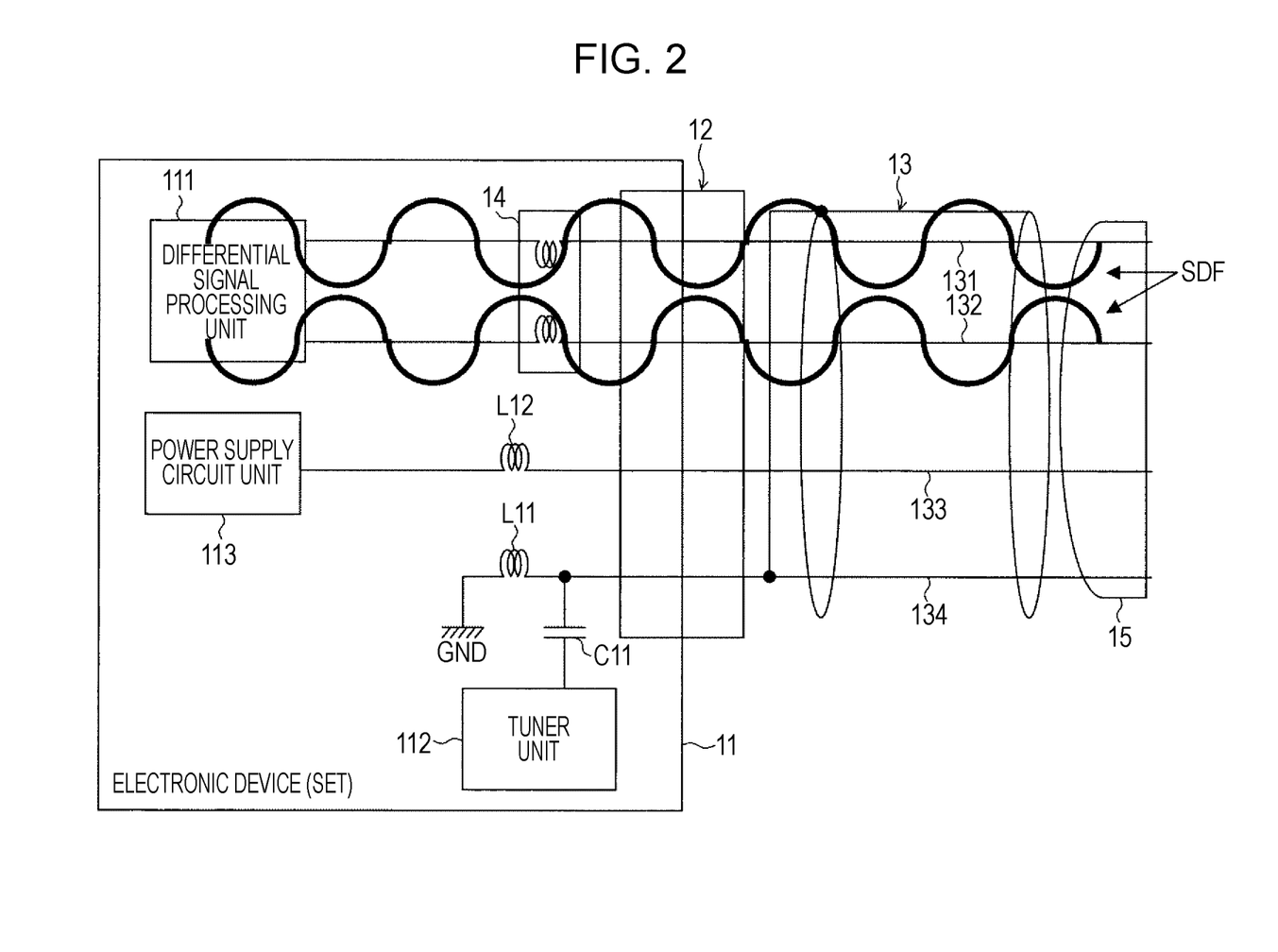
FIG. 2 is a diagram explaining the behavior of the receiving apparatus that communicates with the use of differential signals.
Figure 3:
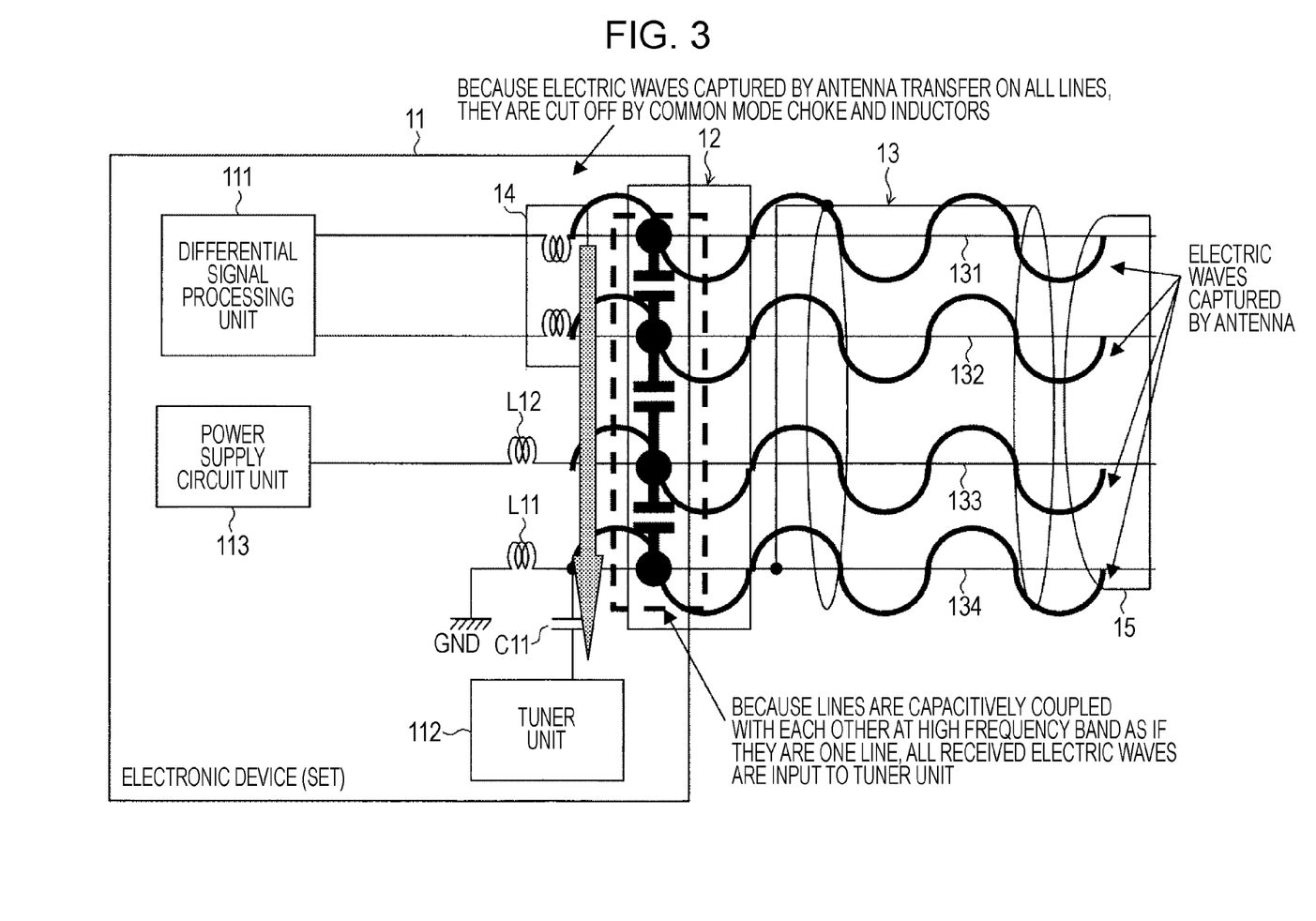
FIG. 3 is a diagram explaining the behavior of the receiving apparatus that receives signals with the use of an antenna.

Next, the behavior of the receiving apparatus 10 will be described by focusing on the principle of signal differentiation with reference to FIG. 2 and FIG. 3. FIG. 2 is a diagram explaining the behavior of the receiving apparatus 10 that communicates with the use of differential signals. FIG. 3 is a diagram explaining the behavior of the receiving apparatus 10 that receives signals with the use of an antenna.

Firstly, the behavior of the receiving apparatus 10 in the case of using a differential signal SDF in the data communication with the external electronic device will be described with reference to FIG. 2.

The differential signal SDF sent by the external electronic device (not shown) is input into the electronic device 11 through the core lines 131 and 132 of the multi-core shielded cable 13 and the connector 12. In this case, the differential signal SDF can pass through the common mode choke 14 without being attenuated. Therefore, the differential signal SDF reaches the differential signal processing unit 111 almost as it is. In addition, because common mode noises included in the differential signal SDF can be canceled out by the common mode choke 14, the differential signal SDF can be transferred at a high data transfer rate.

Next, the behavior of the receiving apparatus 10 in the case of receiving signals with the use of an antenna will be described.

The shield section 135 of the multi-core shielded cable 13 is connected to the core line 134 that is connected to the tuner unit 112 of the electronic device 11 through the capacitor C11 in order to realize an antenna function. Owing to the shield section 135 being connected to the core line 134, signals that resonates with the shield section 135 can be transmitted to the electronic device 11 by the multi-core shielded cable 13. In the case of receiving television signals, because the frequencies of the television signals are high frequencies, capacitive coupling occurs among the core lines. In other words, the core lines 131 and 132 are capacitively coupled owing to capacitances between the two core lines at high frequency bands. The relation between the core lines 132 and 133 and the relation between the core lines 133 and 134 can be said to be similar to the relation between the core lines 131 and 132. Therefore, although the high frequency signals leak to the core lines 131, 132, and 133 other than the core line 134 connected to the tuner unit 112 of the electronic device 11, the high frequency signals on the core lines 131, 132, and 133 are blocked by the common mode choke 14 and the inductors L11 and L12. As a result, the high frequency signals can be sent to the tuner unit 112 that is expected to receive the high frequency signals. In this case, the currents of the high frequency signals flowing through the core lines 131 and 132 are both common mode currents, so that they can be stopped from reaching the differential signal processing unit 111 by the common mode choke 14.

Figure 4A:
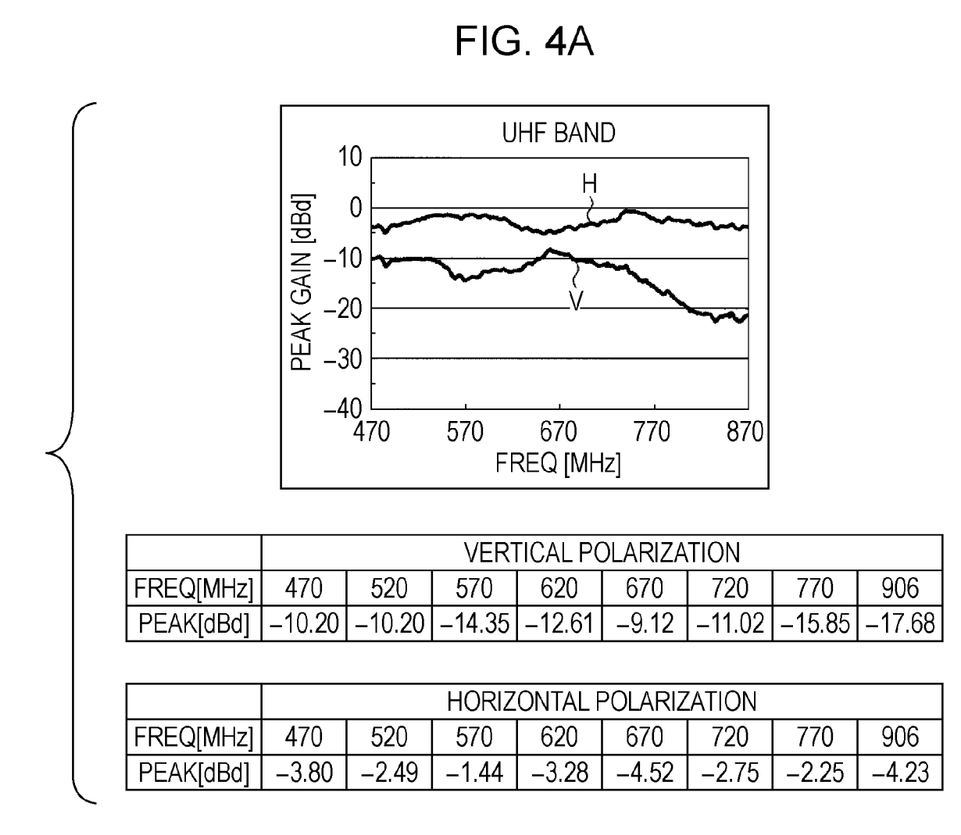
FIGS. 4A and 4B are a diagram showing the peak gain vs. frequency characteristics of the receiving apparatus.
Figure 4B:
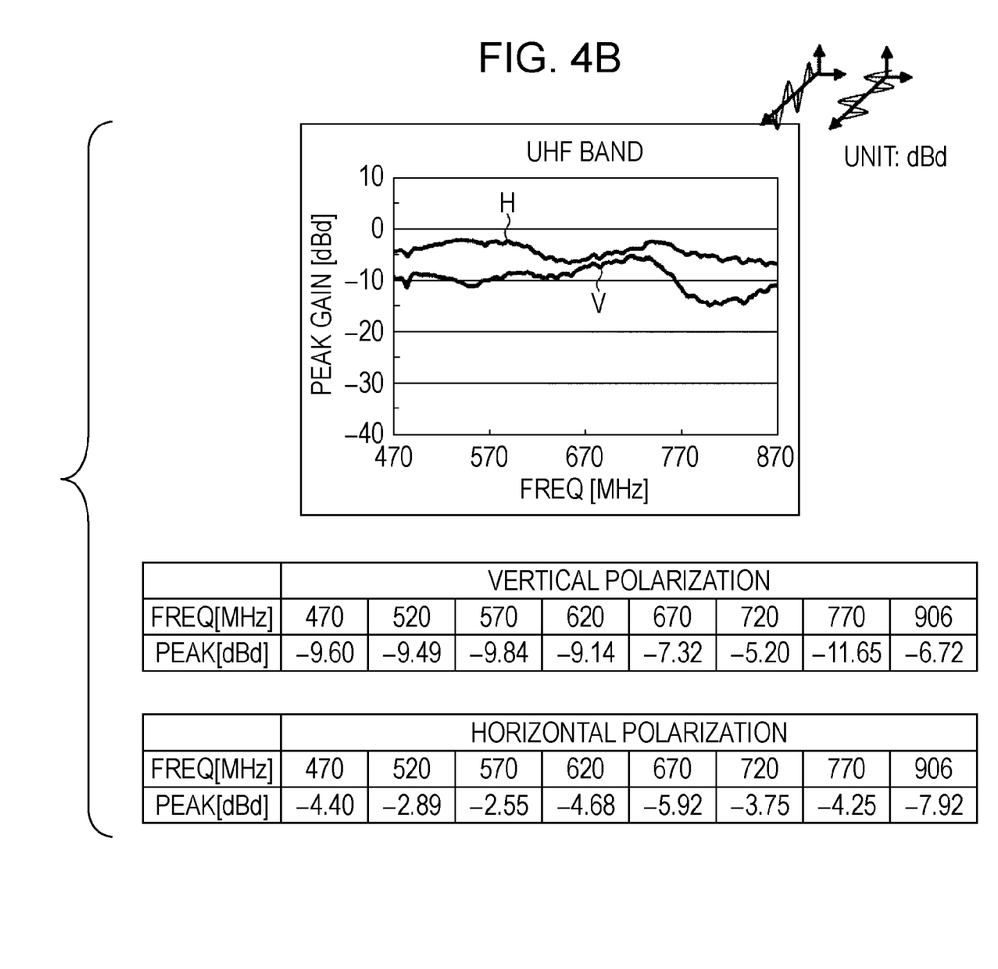
Figure 5:
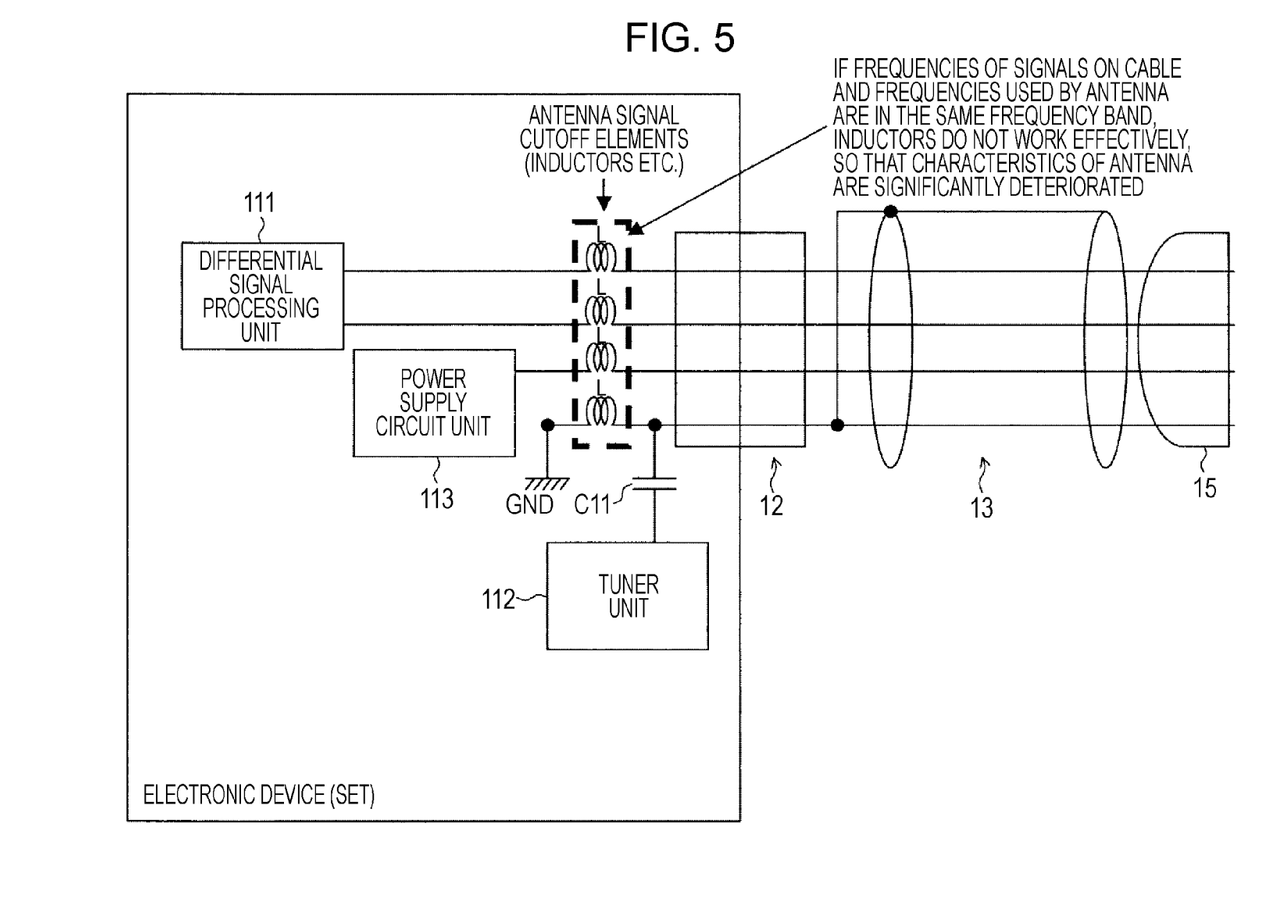
FIG. 5 is a diagram showing the configuration of the receiving apparatus that adopts inductors instead of a common mode choke.

FIG. 4A and FIG. 4B are diagrams showing peak gain vs. frequency characteristics of receiving apparatuses in a UHF band. FIG. 4A is a diagram showing peak gain vs. frequency characteristics of the receiving apparatus according to this embodiment of the present invention. FIG. 4B is a diagram showing peak gain vs. frequency characteristics of a receiving apparatus in which two inductors are used instead of the common mode choke. FIG. 4B is cited as a comparative example to FIG. 4A. In FIG. 4A and FIG. 4B, curves denoted by H are output characteristics of horizontally-polarized waves, and curves denoted by V are output characteristics of vertically-polarized waves. FIG. 5 is a diagram showing the configuration of a receiving apparatus that adopts inductors instead of the common mode choke as a comparative example.

FIG. 4A and FIG. 4B show the characteristics of the receiving apparatus with the common mode choke and those of the receiving apparatus with the inductors instead of the common mode choke. These characteristics are measured in the UHF band using the cable antenna. In FIG. 4A and FIG. 4B, the horizontal axis shows frequencies, and the vertical axis shows antenna gains. These curves show the peak gains relative to the peak gain of a dipole antenna that is one of ideal antennas, and a higher peak gain shows a better characteristic. The curves denoted by H are antenna gains of transmitting antennas that output horizontally-polarized waves, and the curves denoted by V are antenna gains of transmitting antennas that output vertically-polarized waves. Judging from FIG. 4A and FIG. 4B, the characteristics of the receiving apparatus according to this embodiment of the present invention is by no means inferior to those of the receiving apparatus cited as the comparative example. In addition, because of its capability of cutting off common mode signals, the receiving apparatus according to this embodiment of the present invention can separate overlapped signals.

In the receiving apparatus that adopts inductors instead of the common mode choke in FIG. 5, if the frequencies of signals on the cable and the frequencies used by the antenna are in the same frequency band, the inductors do not work effectively, so that the characteristics of the antenna are significantly deteriorated.

The receiving apparatus 10 according to this embodiment of the present invention includes: the electronic device 11; the connector 12 provided to the electronic device 11; and the multi-core shielded cable 13 that is connected to the connector 12 and used as the transmission cable. The electronic device 11 includes the tuner unit 112 that receives broadcast waves; and the differential signal processing unit 111 that sends and receives data with the use of differential signals. The tuner unit 112 and the differential signal processing unit 111 are connected to the connector 12. The multi-core shielded cable 13 includes at least two transmission lines that transmit the differential signals SDF, and the at least two transmission lines are capacitively coupled with each other at high frequency bands owing to capacitances among the at least two lines. In addition, there is at least one common mode choke 14 across the differential signal transmission lines inside the electronic device 11.

As a result, with the use of a common mode choke across the transmission lines of an apparatus, this embodiment of the present invention enables the apparatus, which has a function of transmitting and receiving data to and from other apparatuses with the use of differential signals typified by a USB signal, to separate the signals even if the frequencies of these signals overlap each other. In addition, according to this embodiment, a cable of a receiving apparatus used for communication or power supply can be used as an antenna, so that the portability and convenience of the receiving apparatus can be improved. In addition, according to this embodiment, the footprint and cost of the receiving unit can be reduced.

2. The Second Embodiment of the Present Invention

Figure 6:
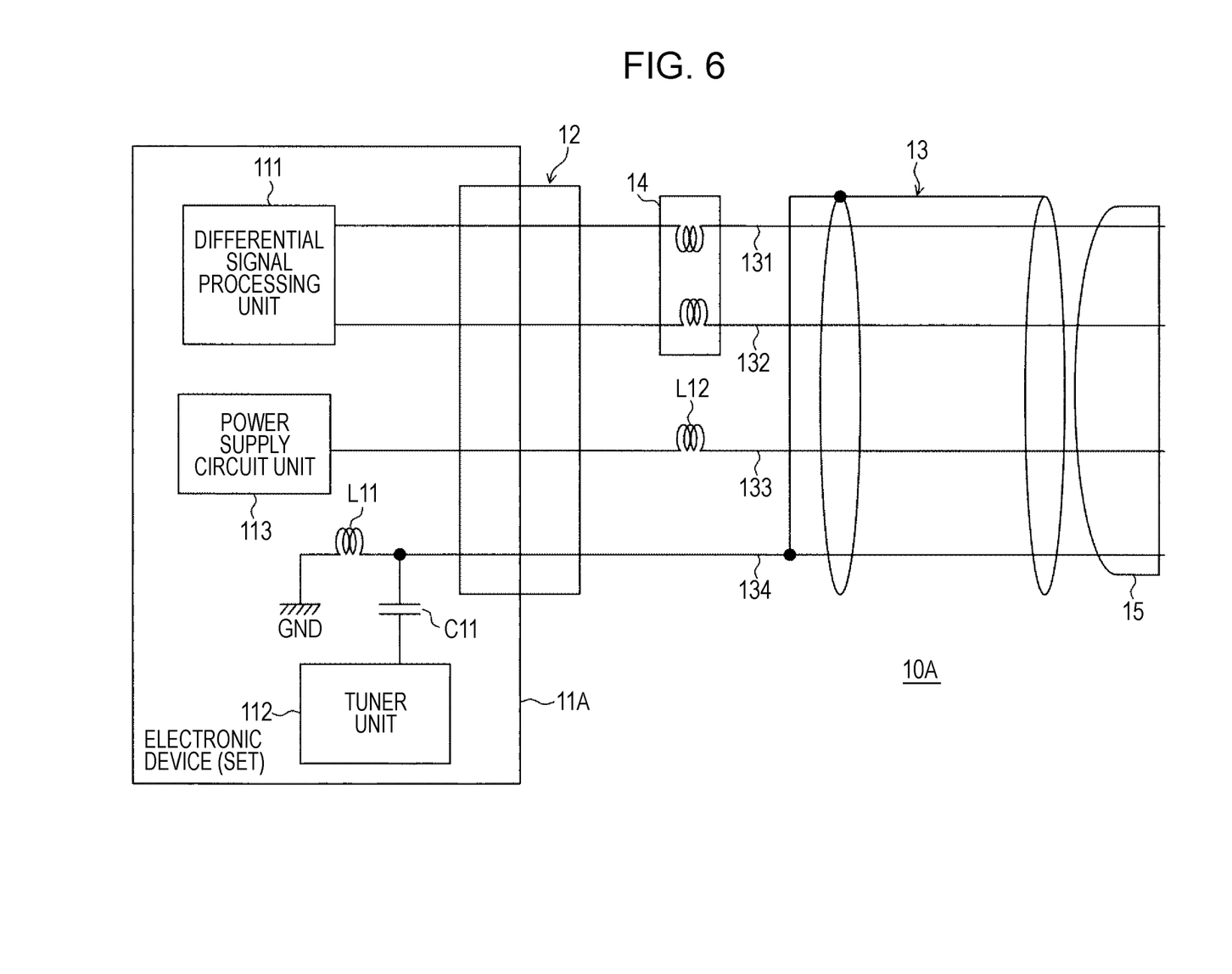
FIG. 6 is a diagram showing the configuration of a receiving apparatus according to a second embodiment of the present invention.

FIG. 6 is a diagram showing the configuration of a receiving apparatus according to the second embodiment of the present invention.

The receiving apparatus 10A of this second embodiment is different from the receiving apparatus 10 of the first embodiment in that a common mode choke 14 is installed not inside an electronic device 11A but across core lines 131 and 132 of a multi-core shielded cable 13. In addition, in the receiving apparatus 10A of this second embodiment, an inductor L12 used for a power supply circuit 113 is also installed not inside the electronic device 11A but on a core line 133 of the multi-core shielded cable 13.

In this way, in the receiving apparatus 10A of this second embodiment, the elements used for separating signals are not installed in the electronic device 11A, but installed across or on the core lines of the multi-core shielded cable 13 in order to downsize the electronic device 11A.

The other units and elements are combined in the same way as those in the first embodiment. This second embodiment can provide the same advantageous effect as that the first embodiment provides.

3. The Third Embodiment of the Present Invention

Figure 7:
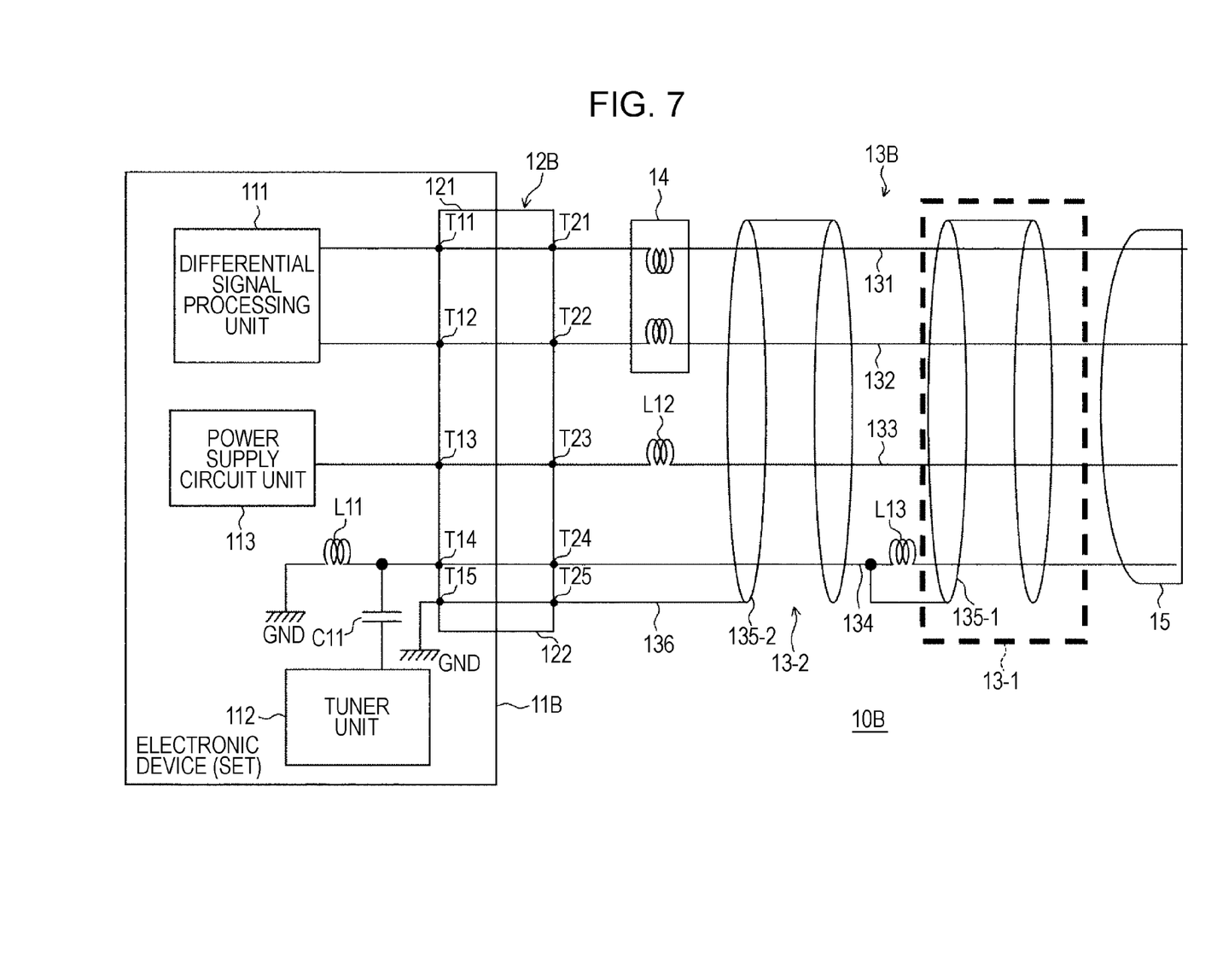
FIG. 7 is a diagram showing the configuration of a receiving apparatus according to a third embodiment of the present invention.

FIG. 7 is a diagram showing the configuration of a receiving apparatus according to a third embodiment of the present invention.

The receiving apparatus 10B of this third embodiment is different from the receiving apparatus 10A of the second embodiment in that a multi-core shielded cable 13B is divided into an antenna cable section 13-1 that works as an antenna and a shielded cable section 13-2.

As shown in FIG. 7, the antenna cable section 13-1 is installed nearer to a second connector 15 used for connection to an external device than the shielded cable section 13-2. In addition, there are following differences between the third embodiment and the second embodiment. An inductor L13 for cutting off high frequencies is installed on a part of a core line 134 that is located between the antenna cable section 13-1 and the shielded cable section 13-2. A shield section 135-1 of the antenna cable section 13-1 is connected to a part of the core line 134 that is located between the inductor L13 and the shielded cable section 13-2. The connector 12B has a terminal T15 on a first connection section 121 and a terminal T25 on a second connection section 122, and a shield section 135-2 of the shielded cable section 13-2 is connected to the terminal T25 of the connector 12B through a line 136. The terminal T15 of the first connection section 121 and the terminal T25 of the second connection section 122 are electrically connected, and the terminal T15 is connected to a ground terminal GND in an electronic device 11B.

As described above, the receiving device 10B according to this third embodiment of the present invention reduces noises generated at the receiving device (set) 11B and suppresses adverse effects by the ground terminal GND which can be lessened by detaching the feeding point of the antenna cable section 13-1 from the receiving device set 11B. The receiving device 10B of the third embodiment has a pair of terminals T15 and T25 that the receiving device 11 of the first embodiment or the receiving device 11A of the second embodiment does not have.

The other units and elements are combined in the same way as those in the second embodiment. This third embodiment can provide the same advantageous effect as that the first embodiment or the second embodiment provides.

4. The Fourth Embodiment of the Present Invention

Figure 8:
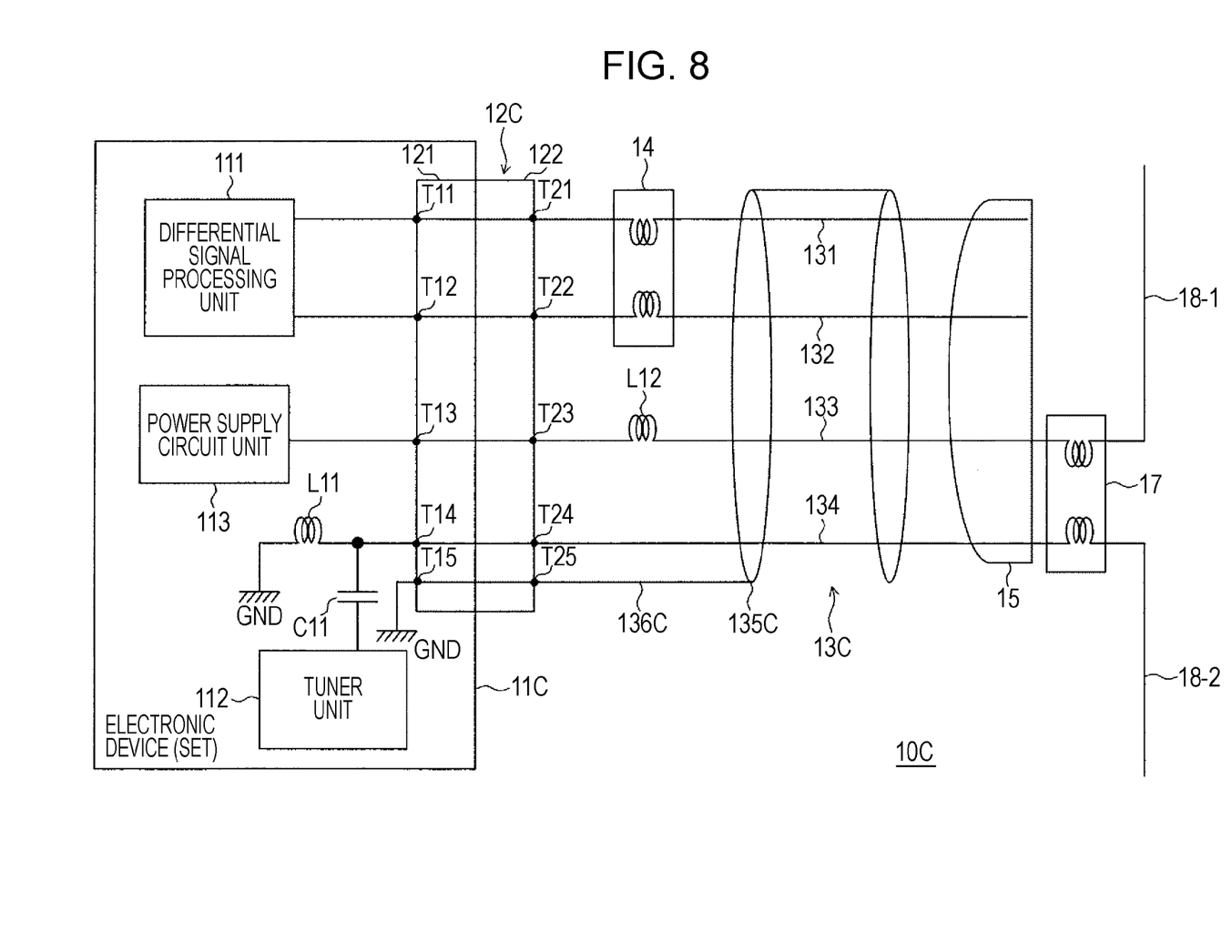
FIG. 8 is a diagram showing the configuration of a receiving apparatus according to a fourth embodiment of the present invention.

FIG. 8 is a diagram showing the configuration of a receiving apparatus according to a fourth embodiment of the present invention.

The receiving apparatus 10C of this fourth embodiment is different from the receiving apparatus 10A of the second embodiment in that, in order to significantly lessen adverse effects from a receiving device set 11C, a multi-core shielded cable 13C is not used as an antenna but used only as a transmission line for antenna signals. The connector 12C has a terminal T15 on a first connection section 121 and a terminal T25 on a second connection section 122, and a shield section 135C of the multi-core shielded cable 13C is connected to the terminal T25 through a line 136C. The terminal T15 of the first connection section 121 and the terminal T25 of the second connection section 122 are electrically connected, and the terminal T15 is connected to a ground terminal GND in the electronic device 11C. In addition, at the side of a second connector 15, core lines 133 and 134 are connected to external antenna elements 18-1 and 18-2, which form a dipole antenna, respectively through a balanced-to-unbalanced transformer (balun) 17. To put it concretely, one end of the core line 133, which is nearer to the second connector 15, is connected to the antenna element 18-1 through the balun 17, and one end of the core line 134, which is nearer to the second connector 15, is connected to the antenna element 18-2 through the balun 17.

In the receiving apparatus 10C of this fourth embodiment of the present invention, it is possible to provide an external antenna with an amplifying function, if desired, by feeding electric power from the electronic device (set) 11C.

The other units and elements are combined in the same way as those in the second embodiment. This fourth embodiment can provide the same advantageous effect as that the first embodiment or the second embodiment provides.

5. The Fifth Embodiment of the Present Invention

Figure 9:
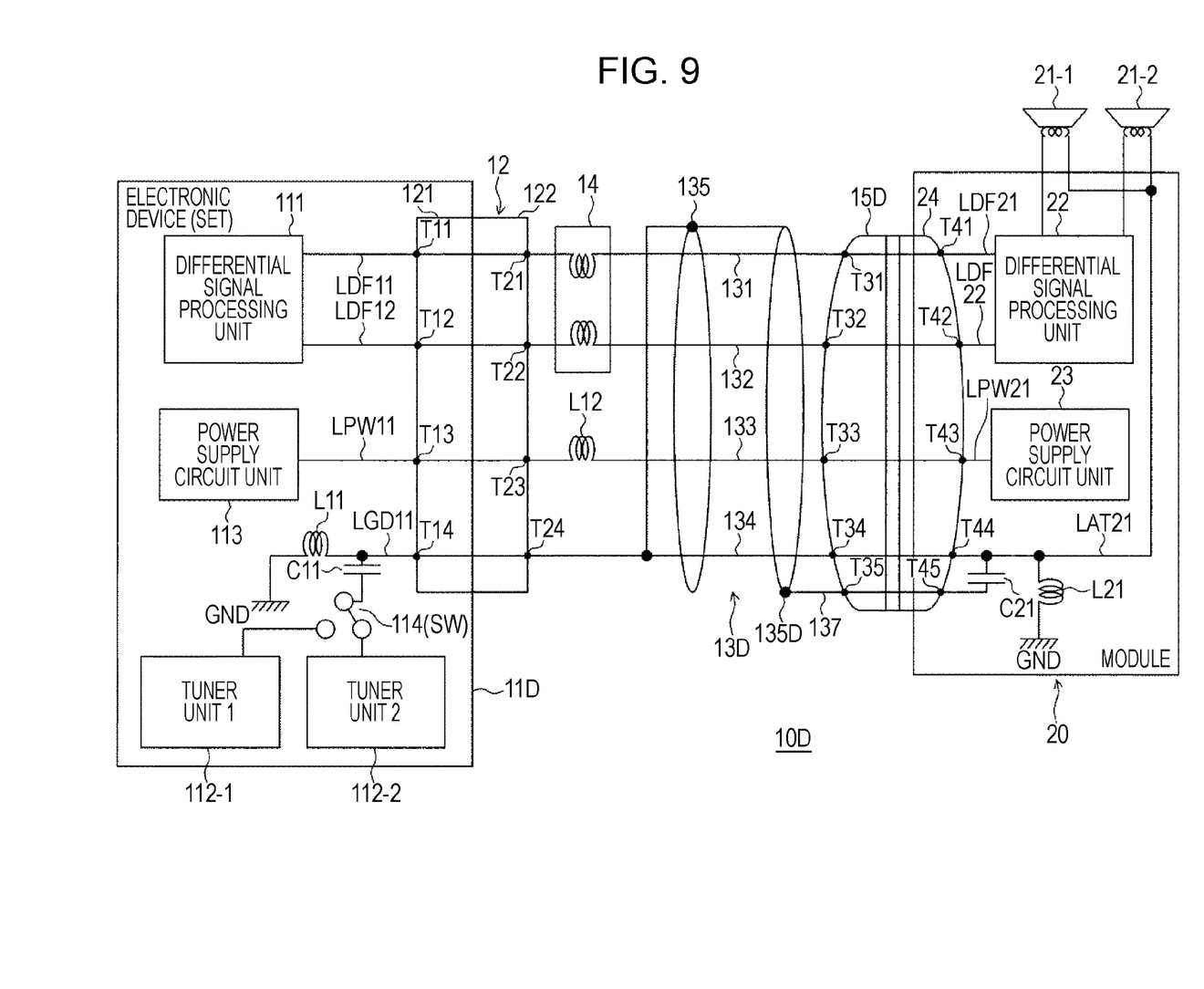
FIG. 9 is a diagram showing the configuration of a receiving apparatus according to a fifth embodiment of the present invention.

FIG. 9 is a diagram showing the configuration of a receiving apparatus according to a fifth embodiment of the present invention.

The receiving apparatus 10D of this fifth embodiment is different from the receiving apparatus 10A of the second embodiment in the following two points. The first point is that a module 20 is connected to a second connector 15D, and the module 20 works as an antenna. The second point is that two tuner units 112-1 and 112-2 are installed in an electronic device 11D, and that they are alternately connected to a ground line LGD11 in the electronic device by a switch 114. In this embodiment, an earphone module is adopted as the module 20. The module 20 includes earphones 21-1 and 21-2, a differential signal processing unit 22, a power supply circuit unit 23, a connector 24, a capacitor C21, and an inductor L21. The module 20 further includes differential signal transmission lines LDF21 and LDF22, a power supply line LPW21, and an antenna line LAT21.

The second connector 15D includes terminals T31, T32, T33, T34, and T35. As shown in FIG. 9, the terminal T31 is connected to one end of a core line 131 of a multi-core shielded cable 13D, the terminal T32 is connected to one end of a core line 132, the terminal T33 is connected to one end of a core line 133, and the terminal T34 is connected to one end of a core line 134. In addition, the terminal T35 is connected to a shield section 135D of the multi-core shielded cable 13D through a line 137.

One end of the earphone 21-1 and one end of the earphone 21-2 are connected to the differential signal processing unit 22, and the other ends of the earphones 21-1 and 21-2 are connected to the antenna line LAT21 in common. The differential signal processing unit 22 is connected to terminals T41 and T42 of the connector 24 through the differential signal transmission lines LDF21 and LDF22. The power supply circuit unit 23 is connected to a terminal T43 of the connector 24 through the power supply line LPW21.

The antenna line LAT21 is connected to a terminal T44 of the connector 24. The antenna line LAT21 is also connected to a terminal T45 of the connector 24 through the capacitor C21. In addition, the inductor L21 is installed between the antenna line LAT21 and a ground terminal GND.

The connection between the second connector 15D and the connector 24 of the module 20 is removable.

When the connector 24 is in a connected state with the second connector 15D, the terminals T41, T42, T43, T44, and T45 are electrically connected to the terminals T31, T32, T33, T34, and T35 respectively.

To put it concretely, when the connector 24 is in a connected state with the second connector 15D, the terminal T41 is electrically connected to the terminal T31; when the connector 24 is in a connected state with the second connector 15D, the terminal T42 is electrically connected to the terminal T32, when the connector 24 is in a connected state with the second connector 15D, the terminal T43 is electrically connected to the terminal T33; when the connector 24 is in a connected state with the second connector 15D, the terminal T44 is electrically connected to the terminal T34; and when the connector 24 is in a connected state with the second connector 15D, the terminal T45 is electrically connected to the terminal T35.

As described above, the receiving apparatus 10D of this fifth embodiment of the present invention is configured to cause the module 20 connected to the second connector 15D to work as an antenna. This fifth embodiment provides the module 20 with a so-called double feeding function.

The other units and elements are combined in the same way as those in the second embodiment. This fifth embodiment can provide the same advantageous effect as that the first embodiment or the second embodiment provides.

6. The Sixth Embodiment of the Present Invention

Figure 10:
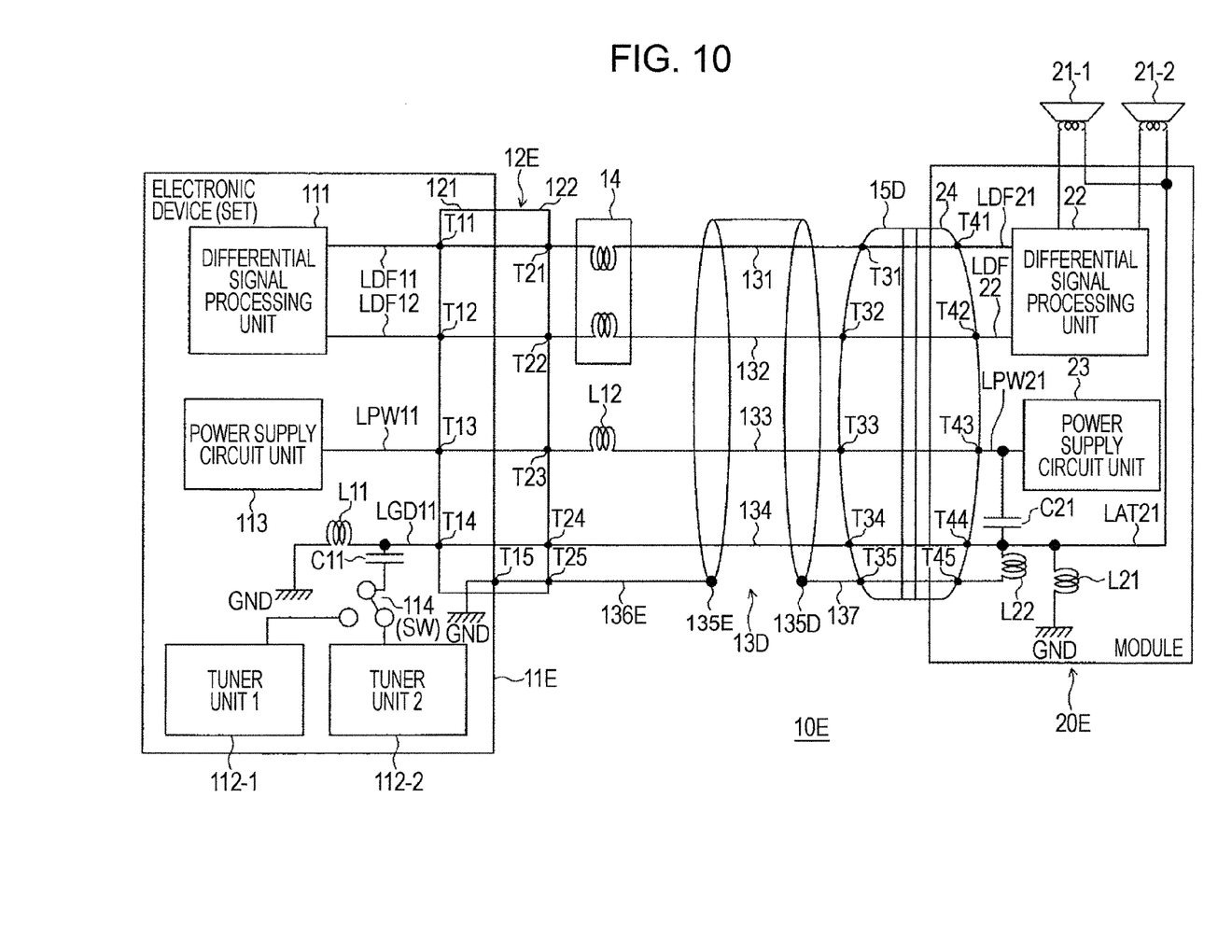
FIG. 10 is a diagram showing the configuration of a receiving apparatus according to a sixth embodiment of the present invention.

FIG. 10 is a diagram showing the configuration of a receiving apparatus according to a sixth embodiment of the present invention.

The receiving apparatus 10E of this sixth embodiment is different from the receiving apparatus 10D of the fifth embodiment in the following three points. The first point is that there is an inductor L22 instead of a capacitor C21 between an antenna line LAT21 and a terminal T45 of a connector 24 in a module (earphone module) 20E. The second point is that the capacitor C21 is installed between a power supply line LPW21 and the antenna line LAT21. The third point is that a terminal T15 is installed on a first connection section 121 of a connector 12E, and a terminal T25 is installed on a second connection section 122 of the connector 12E, and that a shield section 135F of a shielded cable section 13D is connected to the terminal T25 through a line 136E. The terminal T15 of the first connection section 121 and the terminal T25 of the second connection section 122 are electrically connected, and the terminal T15 is connected to a ground terminal GND in an electronic device 11E.

As described above, the receiving apparatus 10E of this sixth embodiment of the present invention is configured to cause the module 20 connected to the second connector 15D to work as an antenna just like the receiving apparatus 10D of the fifth embodiment of the present invention. The type of the antenna this sixth embodiment provides is a so-called sleeve type.

The other units and elements are combined in the same way as those in the fifth embodiment. This sixth embodiment can provide the same advantageous effect as that the first embodiment or the second embodiment provides.

7. The Seventh Embodiment of the Present Invention

Figure 11:
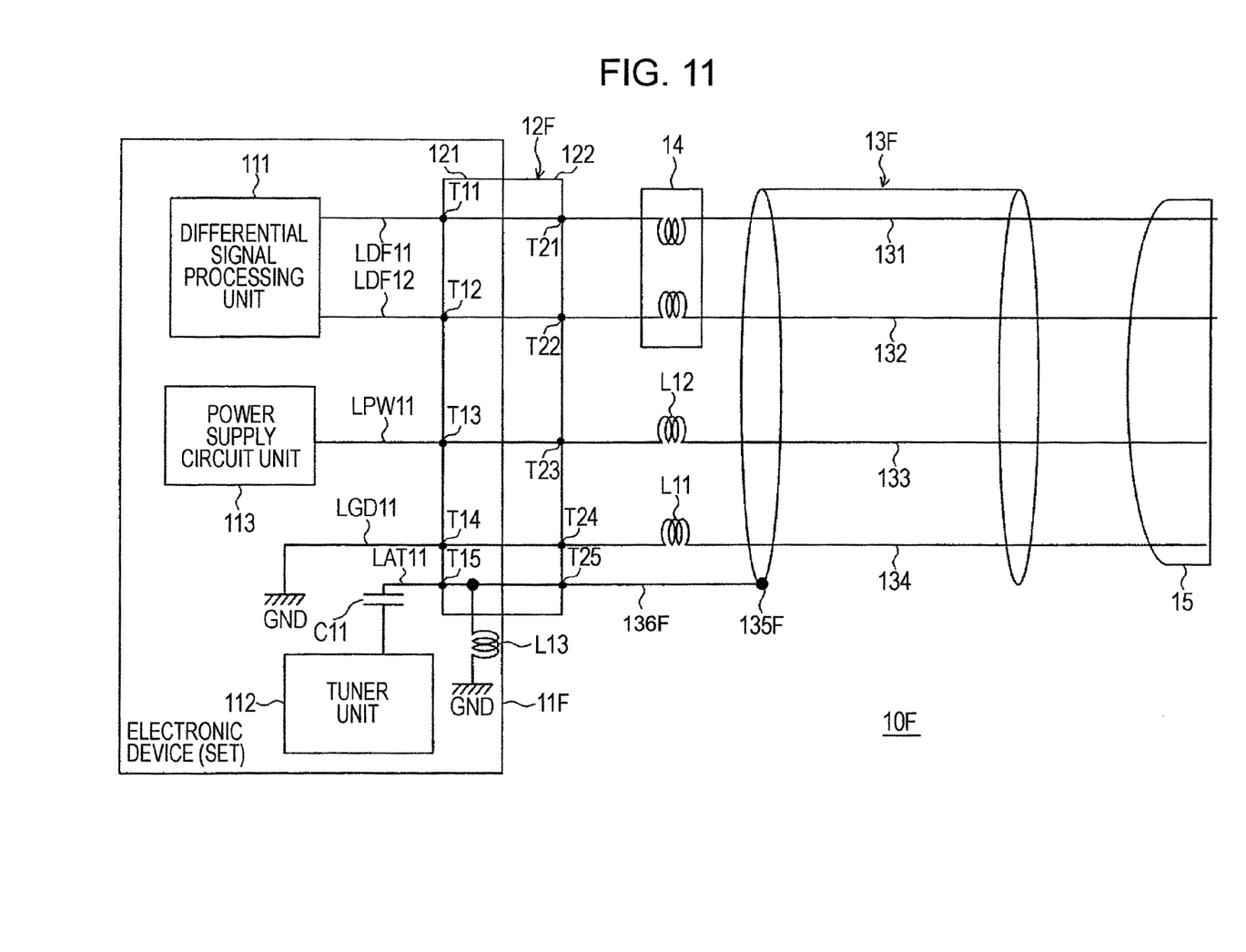
FIG. 11 is a diagram showing the configuration of a receiving apparatus according to a seventh embodiment of the present invention.

FIG. 11 is a diagram showing the configuration of a receiving apparatus according to a seventh embodiment of the present invention.

The receiving apparatus 10F of this seventh embodiment is different from the receiving apparatus 10A of the second embodiment as follows. Only a multi-core shielded cable 13F is used as an antenna. A terminal T15 is installed on a first connection section 121 of a connector 12F, and a terminal T25 is installed on a second connection section 122 of the connector 12F, and a shield section 135F of the multi-core shielded cable 13F is connected to the terminal T25 through a line 136F. The terminal T15 of the first connection section 121 and the terminal T25 of the second connection section 122 is electrically connected, and the terminal T15 is connected to a tuner unit 112 in an electronic device 11F through an antenna line LAT11 and a capacitor C11. An inductor L13 is installed between the antenna line LAT11 and a ground terminal GND. In addition, an inductor L11 is installed on a core line 134 outside the electronic device 11F.

As described above, the receiving apparatus 10F of this seventh embodiment of the present invention is configured to cause only the multi-core shielded cable 13F to work as an antenna, and it is also possible to cause the multi-core shielded cable 13F work as a monopole antenna.

The other units and elements are combined in the same way as those in the second embodiment. This seventh embodiment can provide the same advantageous effect as that the first embodiment or the second embodiment provides.

The present application contains subject matter related to that disclosed in Japanese Priority Patent Application JP 2009-064539 filed in the Japan Patent Office on Mar. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A receiving apparatus comprising:
an electronic device;
a connector that is provided to the electronic device;
a transmission cable that is connected to the connector, wherein the electronic device includes:
    a tuner unit connected to the connector and configured to receive broadcast waves; and
    a differential signal processing unit to send and receive data with the use of differential signals on internal transmission lines that connect the differential signal processing unit to the connector, and wherein the transmission cable includes at least two external transmission lines to transmit differential signals, each of the external transmission lines being capacitively coupled with the other owing to capacitances among the external transmission lines; and
at least one common mode choke that is installed across the internal transmission lines inside of the electronic device or the external transmission lines outside of the electronic device.

2. The receiving apparatus according to claim 1, wherein:
the transmission cable is a multi-core shielded cable;
shielding of the multi-core shielded cable is connected to a core line of the multi-core shielded cable other than external transmission lines for transmitting the differential signals; and
the core line is connected to the tuner unit through the connector.

3. The receiving apparatus according to claim 1, wherein:
the transmission cable is a multi-core shielded cable;
shielding of the multi-core shielded cable is connected to the tuner unit through a core line of the multi-core shielded cable other than the external transmission lines for transmitting the differential signals and through the connector; and
the multi-core shielded cable is divided into a shielded cable section and an antenna cable section in such a way that the shielded cable section is disposed nearer to the electronic device than the antenna cable section, wherein:
    shielding of the shielded cable section is connected to a ground terminal of the electronic device through the connector; and
    shielding of the antenna cable section is connected to the core line other than the external transmission lines for transmitting the differential signals.

4. The receiving apparatus according to claim 3, wherein a high frequency cutoff element is installed on a part of the core line, the part being located on the antenna cable side relative to the connection point of the shielding of the antenna cable section and the core line.

5. The receiving apparatus according to claim 1, further comprising a second connector connected to the other end of the transmission cable, the second connector being configured to connect to an external device, the transmission cable being a multi-core shielded cable, wherein:
shielding of the multi-core shielded cable is connected to a ground terminal of the electronic device; and
core lines of the multi-core shielded cable other than the external transmission lines for transmitting the differential signals are connected to antenna elements through the second connector.

6. The receiving apparatus according to claim 5, wherein the core lines other than the external transmission lines for transmitting the differential signals are connected to the antenna elements through a balance-unbalance transformer.

7. The receiving apparatus according to claim 1, further comprising a second connector at the other end of the transmission cable, the second connector being used for connection to an external device, the transmission cable being a multi-core shielded cable, wherein:
shielding of the multi-core shielded cable is connected to a core line of the multi-core shielded cable other than external transmission lines for transmitting the differential signals;
the core line is connected to the tuner unit through the connector;

the second connector is configured to connect to a module having an antenna line;

the core line of the multi-core shielded cable other than the external transmission lines for transmitting the differential signals is connected to an antenna line of the module under the condition that the multi-core shielded cable is connected to the module through the second connector; and shielding of the multi-core shielded cable is connected to the antenna line through a capacitor or an inductor.

8. The receiving apparatus according to claim 7, further comprising an inductor between the antenna line and a ground terminal.

9. The receiving apparatus according to claim 1, wherein:
the transmission cable is a multi-core shielded cable;
a core line of the multi-core shielded cable other than the external transmission lines for transmitting the differential signals is connected to a ground terminal of the electronic device through the connector;

shielding of the multi-core shielded cable is connected to the tuner unit through the connector with the use of a connection wire; and an inductor is installed between the connection wire and a ground terminal of the electronic device.

10. The receiving apparatus according to any of claims 1 to 9, wherein the at least one common mode choke is installed in the electronic device.

11. The receiving apparatus according to any of claims 1 to 9, wherein the at least one common mode choke is installed in the transmission cable.

12. The receiving apparatus according to claim 1, wherein the transmission cable has an antenna function for receiving broadcast waves.

13. The receiving apparatus according to any of claims 1, 5, and 6, wherein the transmission cable is connected to an antenna for receiving broadcast waves and signals received by the antenna are transmitted to the electronic device.

* * * * *